3,378,601
RESINOIDS OF CARBOXY CONTAINING CO-
POLYMERS CONTAINING UNSATURATED
ACIDS, AMIDES, OTHER VINYL MONOMERS
AND EPOXIDES
Shigeyoshi Tanaka and Toshiro Minami, Hitachi-shi,
 Japan, assignors to Hitachi Kasei Kogyo Kabushiki Kai-
 sha, Tokyo, Japan, a corporation of Japan
No Drawing. Filed Mar. 26, 1964, Ser. No. 355,058
Claims priority, application Japan, Mar. 28, 1963,
 38/13,996; Aug. 28, 1963, 38/45,217
9 Claims. (Cl. 260—83.1)

ABSTRACT OF THE DISCLOSURE

Resinoids may be prepared by copolymerizing 4–40 parts of a mixture consisting of 2–20 parts of an alpha-beta unsaturated monocarboxylic acid and 2–20 parts of an alpha-beta unsaturated carboxylic acid amide and/or monoalkyl substituted amides, with 30–80 parts of a vinyl monomer and 3–35 parts of polyepoxide, wherein the epoxide is incorporated into the polymer. Phenoplasts or aminoplasts may be added to the copolymer.

---

This invention relates to a method of manufacturing novel resinoids which are useful as coatings, impregnants, and laminated varnishes.

It has been well known by U.S. patents, No. 2,604,464, No. 2,662,870, and No. 2,798,861 that thermo-setting resinoid compositions are obtained by the mere physical mixing of copolymers of $\alpha,\beta$ unsaturated monocarboxylic acids and copolymerizable vinyl monomers with epoxy resins at room temperature.

The said compositions, however, require a high temperature and a long period for curing, and moreover, there are often used curing catalysts because the alkali resistance and weather resistance of the compositions are often deficient on insufficient curing. It is also well known that the use of catalysts is undesirable for the properties of the compositions, since the catalysts decrease their water-proof property and weather resistance. Further, compatibility between the said components may be a problem as they are merely mixed physically; particularly on using high molecular weight epoxy resins such as Epikote 1001, Epikote 1004, and Epikote 1007 manufactured by Shell Petroleum Co., there is a limit on compatibility, and consequently, they cannot be used at all or they limit the type and amount of the vinyl monomer used together for copolymerization; it becomes a great hindrance for obtaining useful coating compositions.

Selection of solvents thus is very important to get the coating compositions of the best properties, but usually it has been restricted.

This invention has been studied in spite of these defects; the first purpose of the invention is to take away, regardless of the molecular weight of the epoxy resins, the limit on the type and amount of the other component, i.e., copolymerizable vinyl monomers; the second is to make it possible to use high molecular weight epoxy resins almost regardless of the selection of solvents, a poor solubility of which has been a problem on using the resins; and the third purpose is to provide thermo-setting resinoids, which are stable at room temperature, cured quickly on heating, give the resultant cured materials an excellent hardness, toughness, flexibility, adhesive property, chemical resistance, stain resistance, and water-proof property, and also show a good coating workability; and other purposes will be clarified in the following description.

A method of manufacturing the resinoids according to this invention is characterized by the solution copolymerization of (1) 4–40 parts by weight of a mixture consisting of 2–20 parts by weight of an $\alpha,\beta$ unsaturated monocarboxylic acid and 2–20 parts by weight of at least one material selected from the group consisting of $\alpha,\beta$ unsaturated monocarboxylic amides and monoalkyl substituted compounds of $\alpha,\beta$ monocarboxylic amides (the alkyl group having 1–4 carbon atoms), with (2) 30–80 parts by weight of more than one vinyl monomer, in the presence of 3–35 parts by weight of an epoxide with a 50–4000 epoxy equivalent, with the use of copolymerization catalysts.

The resinoids obtained according to this invention are high molecular weight graft copolymers possessing epoxy rings, a carboxylic amide group, carboxyl groups, hydroxyl groups, and in some cases, imide groups as reacting functional groups. They are quickly cured at a comparatively low temperature without any curing catalysts; in comparison with the products of conventional known physical mixtures consisting of copolymers containing $\alpha,\beta$ unsaturated monocarboxylic acids and epoxy resins, the new resinoids are cured more rapidly at a lower temperature without any curing catalyst, and the obtained cured materials are also harder and tougher under the same baking conditions and possess an excellent adhesive property, flexibility, chemical resistance, stain resistance and waterproof property. As to a merit of the new copolymers, there can be conquered such a defect of the conventional compositions that the compatibility between epoxy resins and linear high molecular weight compounds is often poor in the conventional compositions, yielded from epoxy resins and linear high molecular compounds by a merely physical blending; for the linear high molecular compounds in the new copolymers are chemically bonded to epoxy resins.

For example, using the previously described high molecular weight epoxy resins, there is observed a great influence on the compositions of the linear high molecular weight compounds being blended together and this causes a considerable limit to the types and amounts of monomers being copolymerized for obtaining a good compatibility; whereas, being comprised in the copolymers as components of the copolymers, according to this invention, the epoxy resins have no effect on compatibility, and the wide application range of the type and amount of the monomers can be chosen optionally.

A great deal of utility of this invention is shown by further example; that is, even on using high molecular weight epoxy resins, according to this invention, solvents can be selected freely; for example, on using Epikote 1001, the composition obtained according to this invention shows a good diluability (solubility) to aromatic solvents, which are poor solvents for Epikote 1001, such as toluene and xylene.

Diepoxides of the polyether type are particularly preferable as epoxides having a 50–4000 epoxy equivalent used in this invention. These diepoxides are polyhydric alcohols or derived from polyhydric alcohols, and there are condensation products of bisphenol-A and epichlorohydrin, for example, Epikote 828, Epikote 1001, Epikote 1004, Epikote 1007, and Epikote 1009 of Shell Petroleum Co., or Araldite 6071, Araldite 6084, Araldite 6097 and Araldite 6099 of Ciba Co., and condensation products of ethylene glycol and epichlorohydrin or of glycerine and epichlorohydrin. Epoxy compounds other than diepoxides are also effective, for example, epoxidized vegetable oils, 3-4-epoxy-6-methylcyclohexane carboxylate, 3-4-epoxy-6-methylcyclohexane carboxylate, 3-4-epoxy-6-cyclohexane carbonate, and 3-4-epoxycyclohexylmethyl. The epoxides used in this invention are selected from ones having a 50–4000 epoxy equivalent, and on the standing point of properties of the cured materials, the ones having a 100–1000 epoxy equivalent are preferable.

Though the said epoxides in this invention can be optionally chosen according to the demand on the properties of the end products, the amount of the one used is limited, for more than 35 parts by weight decreases not only the stability of the resinoids, but also the weather resistance of the cured materials; further, as to white enamel of the final product, its color changes to yellow remarkably in the early period, so it is not suitable for applications requiring high gloss retention and high yellowing resistance such as coatings for automobiles and domestic electric machines.

The one component of copolymerization in the presence of the said epoxides is (1) 4–40 parts by weight of a mixture consisting of 2–20 parts by weight of $\alpha,\beta$ unsaturated monocarboxylic acid and 2–20 parts by weight of at least one compound selected from the group consisting of $\alpha,\beta$ unsaturated monocarboxylic amides and monoalkyl substituted derivatives of monocarboxylic amides.

In this invention, the purpose could not be reached if either one of the said two components of copolymerization is lacking, for example, if one of them is missing, the compatibility of the high molecular weight epoxides is restricted. Both of them possess preferably 0.5–4.0 equivalent of functional group against 1 equivalent of an oxirane ring, corresponding to an epoxy equivalent of the used epoxide. The reaction being performed beyond this range, there are obtained products of poor stability and they can not be practically used.

Examples of $\alpha,\beta$ unsaturated monocarboxylic acids, used in this invention are, for example, acrylic acid and methacrylic acid.

Examples of $\alpha,\beta$ unsaturated monocarboxylic amides used in this invention are, for example, acrylamide and methacrylamide, and examples of monoalkyl substituted compounds of $\alpha,\beta$ unsaturated monocarboxylic amides wherein the alkyl group has 1–4 carbon atoms are, for example, N-methylacrylamide, N-ethylacrylamide, N-n-propylacrylamide, N-n-butylacrylamide, N-methylmethacrylamide, N-ethylmethacrylamide, N-n-propylmethacrylamide, and N-n-butylmethacrylamide.

As vinyl copolymer, the component (2), copolymerized in the presence of epoxides, almost all of the vinyl monomers can be used, and some examples are, styrene, $\alpha$-methyltoluene, vinyltoluene, acrylonitrile, methacrylonitrile, vinyl acetate, and alkylvinyl ether, and also there may be used alkyl acrylates wherein the alkyl group has 1–12 carbon atoms, such as methyl acrylate, ethyl acrylate, n-propyl acrylate, isopropyl acrylate, n-butyl acrylate, isobutyl acrylate, tert.-butyl acrylate and 2-ethylhexyl acrylate, and further alkyl methacrylates wherein the alkyl group has 1–12 carbon atoms, such as methyl methacrylate, ethyl methacrylate, n-propyl methacrylate, butyl methacrylate, isobutyl methacrylate, tert.-butyl methacrylate and 2-ethyl hexyl methacrylate.

Those vinyl monomers are used in the amount of 30–80 parts by weight, whereas more than one of them are optionally selected to use regardless of the types of the used epoxides.

According to this invention, solution copolymerization of the said two components is performed with copolymerization catalysts of organic oxides or azo compounds in the presence of epoxides.

There are, for example, benzoyl peroxide, di-tert.-butylperoxide, and cumene hydroperoxide as organic peroxides, and as azo compounds, there are, for example, $\alpha$-$\alpha'$-azobisisobutyronitrile, etc.

A solvent used in solution copolymerization is optionally selected from the group consisting of such as alcohols, toluene, xylene, methylethylketone, butylcellosolve, dioxane, a toluene-butanol solution mixture, and a xylene-n-butanol solution mixture. Though solution copolymerization is usually performed with the catalyst in the amount of 0.5–3.0% by weight based on the vinyl monomer, at 70°–130° C. polymerization temperature for 0.5–7.0 hours of polymerization period, conditions are not restricted by the said ones but may be preferably chosen depending on various conditions as well as on other usual solution polymerization.

This invention will be explained by examples and a reference example, in which parts are by weight.

Reference Example 23.8 parts of styrene, 34 parts of ethyl acrylate, 3.0 parts of methacrylic acid, 5.4 parts of acrylamide, and as solvents, 35 parts of xylene and 15 parts of n-butanol are weighed and put in a flask equipped with an agitator, a thermometer, a reflux condenser, a dropping funnel and a gas inlet tube, and heated at 80° C. 13.7 parts of styrene, 16.8 parts of ethyl acrylate, 3.3 parts of methacrylic acid, and as a catalyst, a solution mixture consisting of 0.9 part of $\alpha,\alpha'$-azobisisobutyronitrile and 0.6 part of di-tert.-butylperoxide are added dropwise for 30 minutes. Then the reaction is continued for 30 minutes at 80° C. and further for 5 hours at 110° C.

After finishing the reaction the product is diluted with 46.3 parts of xylene and 3.7 parts of n-butanol, and then 20 parts of a solution prepared by dissolving 10 parts of Epikote 1001 in 5 parts of xylene and 5 parts of n-butanol are added to 80 parts of the obtained copolymer solution, and a physical solution mixture of the copolymer and Epikote 1001 are obtained.

Example 1

20 parts of Epikote 1001, 18.8 parts of styrene, 28.5 parts of ethyl acrylate, 2.4 parts of methacrylic acid, 4.3 parts of acrylamide, and as solvents, 25 parts of xylene and 25 parts of n-butanol are weighed and put in the same flask as used in the Reference Example.

They are heated at 80° C., and 11.2 parts of styrene, 11.8 parts of ethyl acrylate, 2.6 parts of methacrylic acid, and as a catalyst, a solution mixture consisting of 0.9 part of $\alpha$-$\alpha'$-azobisisobutyronitrile and 0.6 part of di-tert.-butylperoxide are added dropwise, for 30 minutes, and further kept at 80° C. for 30 minutes; then the reaction is continued for 5 hours at 110° C. After finishing the reaction, the reaction product is diluted with 50 parts of xylene and a copolymer solution possessing 50% of non-volatile content, W–X of the viscosity (Gardner viscosity index), 15.6 of the acid value and less than 1 of the color number (Gardner) is obtained.

The compositions obtained in the Reference Example and Example 1 have the same composition. However, on comparison with the both solutions, the one of the Reference Example is almost opaque but another prepared in Example 1 is a transparent solution; and on making a film from each of them at the normal room temperature, the former one is turbid and opaque, and the latter one is transparent. On heating, the former one is opaque and valueless at all as a coating composition, whereas the latter is transparent and valuable as a coating composition. On measuring toluene tolerance at 20° C., the former shows only 2.1 folds resistant, while the latter shows 3.8 and is tolerance thus sure of possessing an excellent solvent tolerance.

This shows that the linear copolymer prepared in the Reference Example is not compatible with Epikote 1001.

On the contrary to this, the product obtained by copolymerization in the presence of Epikote 1001 in Example 1 is transparent and the coating film prepared by baking is also transparent. This apparently shows that the thermosetting resin prepared from the resinoid according to this invention is quite different from the thermo-setting resin prepared from the conventional known composition by blending merely physically at the normal room temperature.

Moreover, as the resinoids according to this invention are not merely physical mixtures, they show an excellent spray coating workability.

Example 2

20 parts of Epikote 1001, 18.8 parts of methyl methacrylate, 28.5 parts of ethyl acrylate, 2.4 parts of methacrylic acid, 4.3 parts of acrylamide, and as solvents, 25 parts of xylene and 25 parts of n-butanol are weighed and put in the same flask as used the Reference Example. They are heated at 80° C., and 11.2 parts of methyl methacrylate, 11.8 parts of ethyl acrylate, 2.6 parts of methacrylic acid, and as a catalyst, a solution mixture consisting of 0.9 part of α,α'-azobisisobutyronitrile and 0.6 part of di-tert.-butylperoxide, are added dropwise for 30 minutes.

They are further kept for 30 minutes at 80° C., and then the reaction is continued for 5 hours at 110°.

After finishing the reaction, the product is diluted with 50 parts of xylene and the copolymer solution of 50.1% of a non-volatile content, Y–Z of the viscosity, 15.3 of the acid value, and less than 1 of the color number is obtained.

Example 3

30 parts of Epikote 1001, 18.8 parts of vinyl toluene, 28.5 parts of n-butyl acrylate, 2.4 parts of acrylic acid, 4.3 parts of acrylamide, and as solvents, 25 parts of xylene and 25 parts of n-butanol are weighed and put in the same flask as used the Reference Example. They are heated at 80° C., and 11.2 parts of vinyl toluene, 11.8 parts of n-butyl acrylate, 2.6 parts of methacrylic acid, and as a catalyst, a solution mixture consisting of 0.9 part of α,α'-azobisisobutylonitrile and 0.6 part of di-tert.-butylperoxide are added dropwise for 30 minutes.

They are further kept for 30 minutes at 80° C. and then the reaction is continued for 5 hours at 110° C. After finishing the reaction the product is diluted with 50 parts of xylene. The obtained copolymer solution possesses 49.5% of the non-volatile content, W of the viscosity, 15.7 of the acid value and less than 1 of the color number.

100 parts of the epoxy modified copolymer solution (50% of a non-volatile content) obtained in Examples 1–3, are respectively made to white enamel with 50 parts of a rutile type titanium dioxide, and baked respectively on steel plates at 170° C. for 30 minutes; Table 1 shows some of their properties.

TABLE 1

| Item | Specimen | | |
|---|---|---|---|
| | Example 1 | Example 2 | Example 3 |
| Gloss | 95 | 99 | 98 |
| Degree of yellowness | −4.952 | −3.244 | −5.245 |
| Clemens scratch hardness | 158 | 198 | 165 |
| Adhesive property: | | | |
| Cross cut | Excellent | Excellent | Excellent |
| Sketch | Excellent | Excellent | Excellent |
| Erichsen (mm.) | 8.7 | 5.0 | 8.8 |
| Impact (cm.) | 50 | 45 | More than 50 |
| Flexibility (Φ) | 3 | 3 | 3 |
| Chemical resistance: | | | |
| 5% NaOH aqueous solution | Unchanged | Unchanged | Unchanged |
| 5% HCl aqueous solution | Unchanged | Unchanged | Unchanged |
| 5% neutral detergent | Unchanged | Unchanged | Unchanged |
| Boiling water resistance | Unchanged | Unchanged | Unchanged |
| Stain resistance: | | | |
| Red ink | Unchanged | Unchanged | Unchanged |
| Blue ink | Unchanged | Unchanged | Unchanged |
| Mustard | Unchanged | Unchanged | Unchanged |
| Coating workability | Excellent | Good | Excellent |

In Table 1, gloss is measured with a Hunter gloss meter; degree of yellowness is represented by $$Y = \frac{A-B}{G} \times 100$$

impact strength is measured with a Du Pont impact tester having ½ in. diameter and a 1 kg. load; chemical resistance is observed on immersing specimens in each chemical for 3 hours at 70° C.; boiling water resistance is observed on immersing specimens in boiling water for 2 hours at 100° C.; stain resistance is observed on attaching each material for 24 hours at the normal room temperature. The similar tests in other tables are performed in the same methods.

As described above, the resinoids according to this invention can be useful coatings by themselves; however, it is very significant to add to them suitable alkyletherified amino resins or alkyletherified phenol resins or a mixture consisting of more than one of the said resins for the purpose of curing them at a lower temperature (110°–115° C.) and more excellent physical and chemical properties. Alkyletherified amino resins mean condensation products of aldehydes, such as formaldehyde or paraformaldehyde with amino compounds such as urea, N,N'-ethylene urea, dicyandiamide or aminotriazine alkyletherified with alcohols having 1–6 carbon atoms; and as the alkyletherified condensation products of this form, there are, for example, methoxylated methylolurea, methoxylated methylol N,N'-ethylene urea, methoxylated methyloldicyandiamide, methoxylated, methylolmelamine, methoxylated methylolbenzoguanamine, butoxylated methylol N,N'-ethylene urea, butoxylated methyloldicyandiamide, butoxylated methylolmelamine, butoxylated methylolbenzoguanamide; alkyletherified phenol resins are condensation products of aldehydes, such as formaldehydes or paraaldehydes with phenols or their derivatives, for example, alkylphenols such as para-octylphenol, para-tert. butylphenol, cyclohexylphenol and paraphenol, and dihydric phenols such as ortho-cresol, para-cresol, xylenol and bisphenol-A, alkyletherified with alcohols having 1–6 carbon atoms, and there are, for example, butoxylated methylolpara-octylphenol, butoxylated methylolpara-tert. butylphenol, butoxylated methylcyclohexylphenol, butoxylated methylolbisphenol-A, butoxylated methylolortho-cresol, butoxylated methylolmeta-cresol, and butoxylated methylolpara-cresol. These alkyletherified amino resins or alkyletherified phenol resins are preferably added in the amount of 5–50 parts by weight to 50–95 parts by weight of the resinoid obtained according to this invention, and more preferably, 15–25 parts by weight of alkyletherified amino resins or alkyletherified amino resins or alkyletherified phenol resins are added to 50–95 parts by weight of the resinoids obtained according to this invention.

Though it is possible, within the range of compatibility, that more than 50 parts by weight of alkyletherified amino resins or alkyletherified phenol resins are added to 50–95 parts by weight of the resinoids, it results in only an increase of hardness of the cured products, but their toughness, flexibility, adhesive property, impact strength, and water-proof property tend to be decreased.

Alkyletherified amino resins have such character to give the subject products some properties such as hardness, toughness, impact strength, low temperature curing property, water-proof property and stain resistance, and alkyletherified phenol resins have such character to give them some properties such as chemical resistance, water-proof property, and flexibility. Therefore, it is recommended to select and use these resins depending on the application and the purpose.

Detailed explanation is described in the following examples, in which parts are by weight.

Example 4

A composition (50% of a non-volatile content) is obtained by mixing 70 parts of the resinoid prepared in Example 1 with 30 parts of butoxylated methylolmelamine.

It is made to white enamel by adding rutile type titanium dioxide, and baked on a steel plate at 130° C. for 30 minutes and a coating film shown in Table 2 is obtained.

Example 5

Mixing 85 parts of the resinoid obtained in Example 1 with 5 parts of butoxylated methylol urea and 10 parts of butoxylated methylolmelamine and the obtained mixture is made to white enamel as described in Example 4, and baked on a steel plate at 150° C. for 30 minutes. The properties of the coating film are shown in Table 2.

Example 6

Blending 70 parts of the resinoid obtained in Example 2 with 30 parts of methoxylated methylolbenzoguanamine and making the product to white enamel, as described in Example 4, it is baked on a steel plate at 150° C. for 30 minutes. The properties of the coating film are shown in Table 2.

Example 7

Blending 70 parts of the resinoid obtained in Example 3 with 30 parts of butoxylated methylolmelamine, the product is made to white enamel as described in Example 4, and baked on a steel plate at 130° C. for 30 minutes. The properties of the coating film are shown in Table 2.

TABLE 2

| Item | Example 4 | Example 5 | Example 6 | Example 7 |
|---|---|---|---|---|
| Gloss | 98 | 99 | 98 | 97 |
| Degree of yellowness | −7.042 | −6.093 | −7.532 | −6.987 |
| Clemon's scratch hardness | 155 | 152 | 150 | 148 |
| Adhesive property: | | | | |
| Crosscut | Excellent | Excellent | Excellent | Excellent |
| Sketch | Excellent | Excellent | Excellent | Excellent |
| Erichsen (mm.) | 5.8 | 5.2 | 6.7 | 7.8 |
| Impact (cm.) | 35 | 30 | 35 | 45 |
| Flexibility (Φ) | 3 | 3 | 3 | 3 |
| Boiling water resistance | Unchanged | Unchanged | Unchanger | Unchanged |
| Gasoline resistance | Unchanged | Unchanged | Unchanged | Unchanged |
| Chemical resistance: | | | | |
| 5% NaOH aqueous solution | Unchanged | Unchanged | Unchanged | Unchanged |
| 5% HCl aqueous solution | Unchanged | Unchanged | Unchanged | Unchanged |
| 5% neutral detergent solution | Unchanged | Unchanged | Unchanged | Unchanged |
| Stain resistance: | | | | |
| Red ink | Unchanged | Unchanged | Unchanged | Unchanged |
| Blue ink | Unchanged | Unchanged | Unchanged | Unchanged |
| Mustard | Unchanged | Unchanged | Unchanged | Unchanged |
| Coating workability | Excellent | Excellent | Good | Excellent |

Example 8

Blending 90 parts of the resinoid obtained in Example 1 with 10 parts of butoxylated methylolalkylphenol resin (alkylphenol being bisphenol-A), make the mixture flown to coat on a steel plate and baked at 170° C. for 30 minutes.

Example 9

Mixing 70 parts of the resinoid obtained in Example 1 with 30 parts of butoxylated methylolalkylphenol resin (alkylphenol being para-tert.-butylphenol), the mixtures is baked on a steel plate under the same condition as in Example 8.

Example 10

Mixing 90 parts of the resinoid obtained in Example 2 with 10 parts of butoxylated methylolalkylphenol resin (alkylphenol being meta-cresol), the obtained mixture is baked on a steel plate under the same condition as in Example 8.

Example 11

Mixing 90 parts of the resinoid obtained in Example 2 with 10 parts of butoxylated methylolalkylphenol resin (alkylphenol being bisphenol-A), the obtained mixture is baked on a steel plate under the same condition as in Example 8.

The properties of coating films baked according to Examples 8–11 are shown in Table 3.

TABLE 3

| Item | Example 8 | Example 9 | Example 10 | Example 11 |
|---|---|---|---|---|
| Degree of yellowing | (1) | Yellow | (1) | (1) |
| Sward rocker value | 30 | 32 | 31 | 28 |
| Adhesive property: | | | | |
| Crosscut | Excellent | Excellent | Excellent | Excellent |
| Sketch | Excellent | Excellent | Excellent | Excellent |
| Erichsen (mm.) | 8.6 | 7.7 | 8.0 | 8.8< |
| Impact (cm.) | 35 | 30 | 40 | 50 |
| Flexibility (Φ) | 0 | 0 | 0 | 0 |
| Boiling water resistance | Unchanged | Unchanged | Unchanged | Unchanged |
| Chemical resistance: | | | | |
| 5% NaOH aqueous solution | Unchanged | Unchanged | Unchanged | Unchanged |
| 5% $H_2SO_4$ aqueous solution | Unchanged | Unchanged | Unchanged | Unchanged |
| 5% neutral detergent solution | Unchanged | Unchanged | Unchanged | Unchanged |

1 Light yellow.

In Table 3, the tests of degree of yellowing, adhesive property and flexual strength are performed in the same methods as in Table 1; hot water resistance is observed on the coating film after immersing in boiling water for 4 hours; chemical resistance is observed on the coating film after immersing in each chemical for 5 hours; the testing methods in Table 4 are the same as in Table 3.

Example 12

Mixing 75 parts of the resinoid obtained in Example 1 with 10 parts of butoxylated methylolmelamine and 15 parts of butoxylated methylolbisphenol-A, and the obtained mixture is baked on a steel plate under the same condition as in Example 8.

Example 13

5 parts of butoxylated methylolbenzoguanamine and 25 parts of butoxylated methylolbisphenol-A are added to 70 parts of the resinoid obtained in Example 2 and mixed, and the mixture is baked on a steel plate under the same condition as in Example 8.

Example 14

10 parts of butoxylated methylolurea and 10 parts of butoxylated methylol para-cresol are added to 80 parts of the resinoid obtained in Example 3 and mixed, and the obtained mixture is baked on a steel plate under the same condition as in Example 8.

The properties of coating films obtained in Examples 12–14 are shown in Table 4.

TABLE 4

| Item | Specimen | | |
|---|---|---|---|
| | Example 12 | Example 13 | Example 14 |
| Degree of yellowing | (1) | (1) | (2) |
| Sward rocker value | 32 | 39 | 34 |
| Adhesive property: | | | |
|   Crosscut | Excellent | Excellent | Excellent |
|   Sketch | Excellent | Excellent | Excellent |
| Erichsen (mm.) | 8.2 | 7.9 | 8.0 |
| Impact (cm.) | 40 | 35 | 45 |
| Flexibility (Φ) | 0 | 0 | 0 |
| Boiling water resistance | Unchanged | Unchanged | Unchanged |
| Chemical resistance: | | | |
|   5% NaOH aqueous solution | Unchanged | Unchanged | Unchanged |
|   5% $H_2SO_4$ aqueous solution | Unchanged | Unchanged | Unchanged |
|   5% neutral detergent solution | Unchanged | Unchanged | Unchanged |

1 Light yellow.
2 Pale yellow.

Notwithstanding that the resinoids and resinoid compounds prepared according to this invention are very stable, they are cured quickly only on heating at a low temperature without curing catalyst. The cured materials show excellent properties as seen clearly in the previous tables.

The compositions obtained in this invention have a good solubility against various solvents, and have a good tolerance against aromatic solvents.

What is claimed is:

1. A process for the preparation of resinoids which comprises the solution copolymerization, in the presence of a polymerization catalyst, of (1) 4–40 parts by weight of a mixture consisting of 2–20 parts by weight of an $\alpha,\beta$-unsaturated monocarboxylic acid and 2–20 parts by weight of at least one amide selected from the group consisting of $\alpha,\beta$-unsaturated monocarboxylic amides and monoalkyl-substituted derivatives of $\alpha,\beta$-unsaturated monocarboxylic amides, wherein the alkyl group has from 1 to 4 carbon atoms, with (2) 30–80 parts by weight of more than one vinyl monomer, the presence of 3–35 parts by weight of an epoxide having an epoxy equivalent of 50–4000.

2. A process for the preparation of resinoid compositions which comprises adding a substance selected from the group consisting of alkylated amine-aldehydes, alkylated phenol-aldehydes and mixtures thereof, the alkyl group thereof being derived from an alkanol having from 1 to 6 carbon atoms, to a resinoid produced by the solution copolymerization, in the presence of a polymerization catalyst, of (1) 4–40 parts by weight of a mixture consisting of 2–20 parts by weight of an $\alpha,\beta$-unsaturated monocarboxylic acid and 2–20 parts by weight of at least one amide selected from the group consisting of $\alpha,\beta$-unsaturated monocarboxylic amides and monoalkyl-substituted derivatives of $\alpha,\beta$-unsaturated monocarboxylic amides, wherein the alkyl group has from 1 to 4 carbon atoms, with (2) 30–80 parts by weight of more than one vinyl monomer, in the presence of 3–35 parts by weight of an epoxide having an epoxy equivalent of 50–4000.

3. The process of claim 2, wherein 5–50 parts by weight of said additive substance is added to 50–95 parts by weight of said resinoid.

4. The process of claim 1, wherein said $\alpha,\beta$-unsaturated monocarboxylic acid is selected from the group consisting of methacrylic acid and acrylic acid, said amide is selected from the group consisting of methacrylamide and acrylamide and said vinyl monomer consists of at least two selected from the group consisting of styrene, vinyltoluene, acrylonitrile, methacrylonitrile, vinyl acetate, alkylvinyl ethers, $C_1$–$C_{13}$-alkyl acrylates and $C_1$–$C_{12}$-alkyl methacrylates.

5. The process of claim 2, wherein said $\alpha,\beta$-unsaturated monocarboxylic acid is selected from the group consisting of metharcylic acid and acrylic acid, said amide is selected from the group consisting of methacrylamide and acrylamide and said vinyl monomer consists of at least two selected from the group consisting of styrene, vinyltoluene, acrylonitrile, methacrylonitrile, vinyl acetate, alkylvinyl ethers, $C_1$–$C_{12}$-alkyl acrylates and $C_1$–$C_{12}$-alkyl methacrylates.

6. The process of claim 5, wherein 5–50 parts by weight of said additive substance is added to 50–95 parts by weight of said resinoid.

7. A resinoid produced by the process of claim 1.

8. A resinoid composition produced by the process of claim 2.

9. A white enamel comprising a mixture of rutile type titanium dioxide and a resinoid composition produced by the process of claim 2.

References Cited

UNITED STATES PATENTS

| | | | |
|---|---|---|---|
| 3,030,332 | 4/1962 | Lombardi | 260—831 |
| 3,057,812 | 10/1962 | Straughan | 260—837 |
| 3,215,756 | 11/1965 | Lombardi | 260—837 |
| 3,247,288 | 4/1966 | Masters | 260—837 |

MURRAY TILLMAN, *Primary Examiner.*

P. LIEBERMAN, *Assistant Examiner.*